US005694266A

United States Patent [19]
Bloom et al.

[11] Patent Number: 5,694,266
[45] Date of Patent: Dec. 2, 1997

[54] TAPE CHASSIS WITH INTEGRATED ISOLATION MOUNTING FEATURES

[75] Inventors: Devin A. Bloom, Loveland; Thomas J. Angellotti; Warren S. Beitscher, both of Fort Collins, all of Colo.

[73] Assignee: Hewlett-Packard Co., Palo Alto, Calif.

[21] Appl. No.: 414,263

[22] Filed: Mar. 31, 1995

[51] Int. Cl.⁶ .................................................. G11B 17/00
[52] U.S. Cl. .................................................... 360/97.01
[58] Field of Search ........................... 360/97.01, 98.01

[56] References Cited

U.S. PATENT DOCUMENTS

| | | | |
|---|---|---|---|
| 4,876,619 | 10/1989 | Suzuki | 360/97.01 |
| 5,149,048 | 9/1992 | Morehouse et al. | 248/632 |
| 5,216,582 | 6/1993 | Russel et al. | 361/395 |
| 5,349,483 | 9/1994 | Tsai | 360/97.01 |
| 5,552,946 | 9/1996 | Bicknese et al. | 360/97.01 |

*Primary Examiner*—John H. Wolff
*Attorney, Agent, or Firm*—Cynthia S. Baan

[57] ABSTRACT

A tape drive chassis with isolation mounting features in the back half of the chassis that enable the chassis to be mounted in a computer bay that is twisted or has misaligned mounting features. The isolation mounting features of the chassis are integral with the chassis and designed to deflect and conform to torque in the computer bay. The isolation mounting features include travel limit stops that limit the distance that the isolation mounting features can be bent. The isolation mounting features ensure that the drive chassis remains planar even if the host computer bay may be twisted or have mounting holes that are not co-planar.

1 Claim, 10 Drawing Sheets

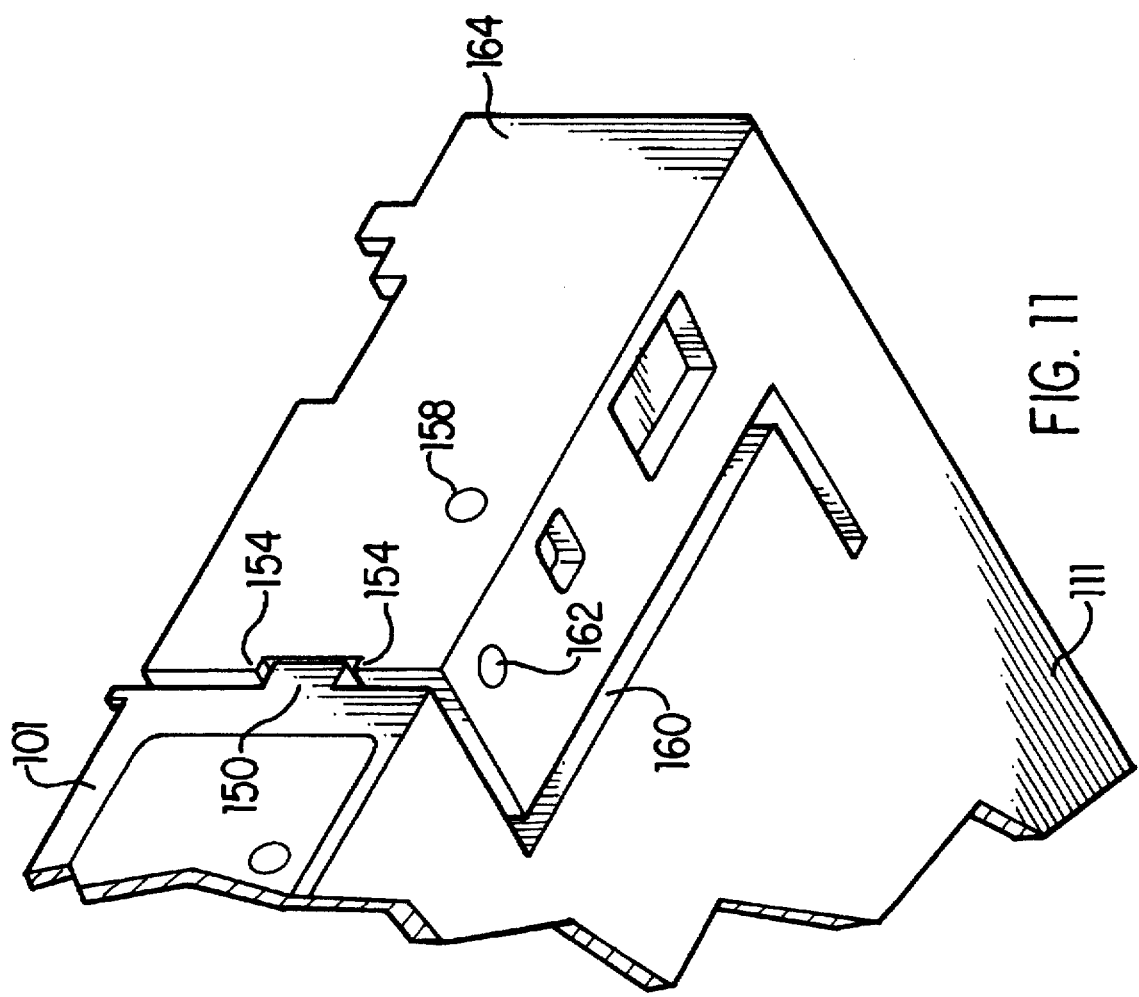

TAPE CHASSIS WITH INTEGRATED ISOLATION MOUNTING FEATURES

FIELD OF THE INVENTION

The present invention relates generally to the high density storage devices, such as tape back-up devices, floppy disk drives, optical storage devices, CD-ROM's, or Winchester drives and more particularly to a means for providing proper feature alignment within a chassis of a tape back-up device.

BACKGROUND OF THE INVENTION

In tape cartridge back-up systems for personal computers, parallel tracks of data are recorded on a tape medium in a data cartridge. Generally, a tape cartridge is inserted into a drive mechanism which has a magnetic head that contacts the magnetic tape within the cartridge through an opening in the front of the cartridge. The magnetic head with one or more read/write gaps must be positioned on the tracks such that the magnetic head gap(s) centerline is within a prescribed dimensional tolerance of the recorded track centerline. If the magnetic head is properly aligned relative to the position of the tape, the information will be properly recorded. This concept can be visualized with reference to FIG. 1 which shows a strip of magnetic tape 10 with tracks 30 containing individual bits 20. For example, a dark bit represents a 1 and a blank bit represents a 0. FIG. 1 shows a tape with perfect alignment, such that all bits are written within the specifically intended bit and track spacing.

FIG. 2 shows a similar strip of magnetic tape which was recorded with the azimuth of the magnetic head skewed a few minutes of arc-angle relative to the tape. If a tape is recorded and read exclusively in the same tape drive, the situation of FIG. 2 does not pose too much of a problem. However, the current trend is for portability of information from one system to another. Thus, a tape may typically be written by one tape drive and read by another tape drive, which can pose problems if either or both of the magnetic heads of the tape drives are not properly aligned with the tape.

For example, if the write magnetic head is skewed a few minutes to the right and the read magnetic head is skewed a few minutes to the left, then the information will not be readable. Accordingly, consistent magnetic head to tape alignment is a serious issue with regards to reading a tape in one drive that was recorded in a different drive. This requires precision in the alignment, positioning and tracking of the magnetic head.

Most of these alignment problems are addressed by industry standard tape and tape cartridge physical dimensions and prescribed dimensional tolerances for the alignment of the magnetic head within the tape drive relative to the positioning of the tape cartridge within the tape drive during use. However, currently tape backup devices are being mounted and used in computer bays of various different computer manufacturers. This raises a new alignment issue. Specifically, when a tape drive is mounted into a computer bay, the mounting holes of the computer bay may not be co-planar or the computer bay itself may be twisted, which may cause the tape drive chassis to be torsionally twisted within the computer bay. If a tape drive is torsionally twisted in the computer bay, the azimuth of the magnetic head to tape alignment may be outside of the industry standard of ±10', which could result in poor read/write performance and make interchangeability between different tape drives difficult. This torsional twisting of a tape drive could also cause binding of internal mechanisms in the tape drive, resulting in excess wear, poor read/write performance, poor cartridge detection, poor beginning and end of tape hole sense, and other system failures.

Many tape drive manufacturers address this problem by adding additional parts to the outside of the drive chassis to isolate the chassis from the computer bay. This solution adds additional cost and complexity to the tape drive design, the cost and number of parts, and the cost and complexity of assembly and disassembly. Accordingly, there is a need in the field of magnetic tape drives for an inexpensive, simple means of maintaining proper feature alignment within the tape drive chassis when the drive is installed in a twisted computer bay or in a computer bay with mounting holes that are not co-planar. There is a further need for a means of maintaining proper feature alignment within the tape drive chassis that does not add additional parts, weight, or assembly/disassembly complexity or cost.

SUMMARY OF THE INVENTION

The present invention overcomes the disadvantages of the prior art by providing a means for maintaining proper feature alignment within the tape drive chassis when the drive is installed in a twisted computer bay or in a computer bay with mounting holes that are not co-planar. The tape drive chassis is made of a rigid material with mounting features in the front of the chassis where the cartridge interface area is located and isolation mounting features in the back of the chassis, which is away from the cartridge interface area. The mounting features in the front of the chassis are integral with the chassis and insure proper cartridge to drive alignment and interface. The isolation mounting features in the back of the chassis are supported on spring arms. The back isolation mounting features and spring arms are integral with the chassis. The spring arms are designed to deflect and conform to any twist in the computer bay in which the drive chassis is mounted. The spring arms are designed with travel limit stops that control how far the arms can be bent, thus, ensuring that the drive chassis stays clear of adjacent peripheral bays within the computer's frame. Accordingly, when the tape drive is mounted in a computer bay, the drive chassis remains flat even though the host computer bay may be twisted or have mounting holes that are not co-planar.

BRIEF DESCRIPTION OF THE DRAWINGS

FIG. 11 shows a close-up bottom, side view of an isolation mounting feature of a tape chassis according to the third embodiment of the present invention.

DETAILED DESCRIPTION OF THE PREFERRED EMBODIMENT

Figure 1:
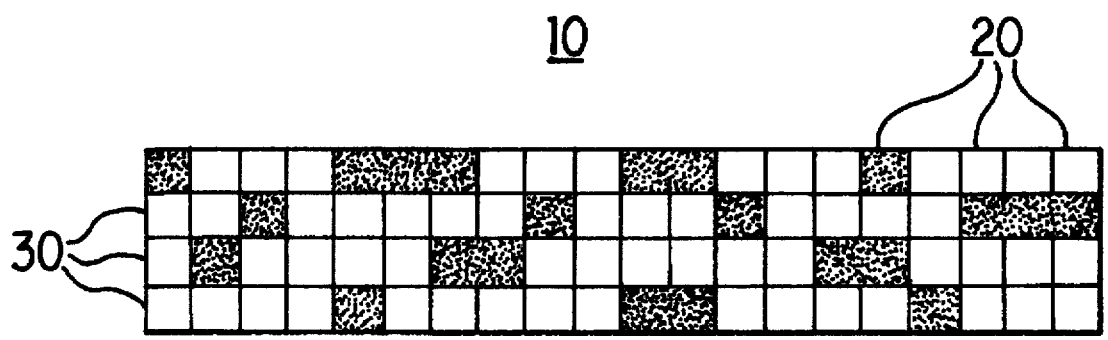
FIG. 1 shows a strip of a magnetic storage tape with several tracks of recorded data that is properly aligned.
Figure 2:
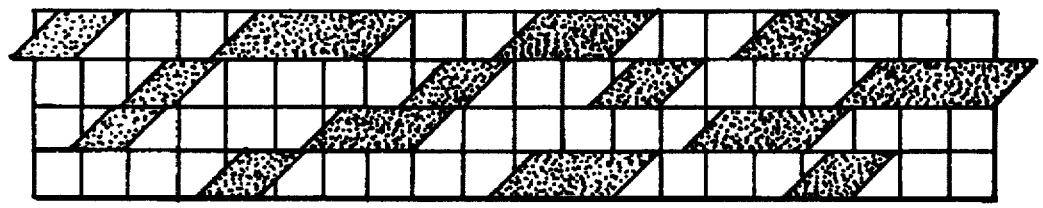
FIG. 2 shows a strip of a magnetic storage tape with several tracks of recorded data, wherein the data was recorded with a slight azimuth misalignment.
Figure 3:
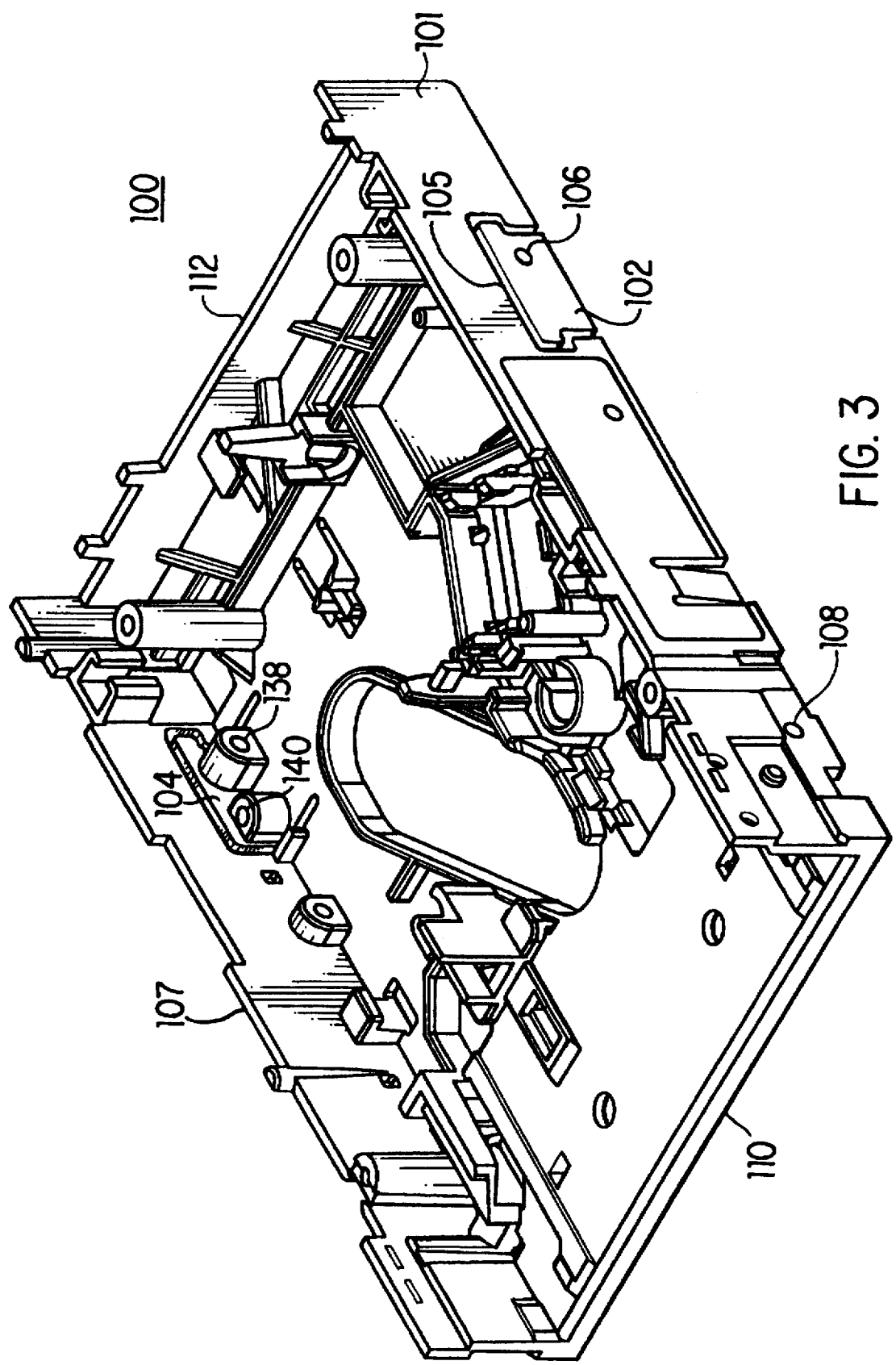
FIG. 3 shows a top, side perspective view of a tape chassis with an isolation mounting feature according to a first embodiment of the present invention.
Figure 4:
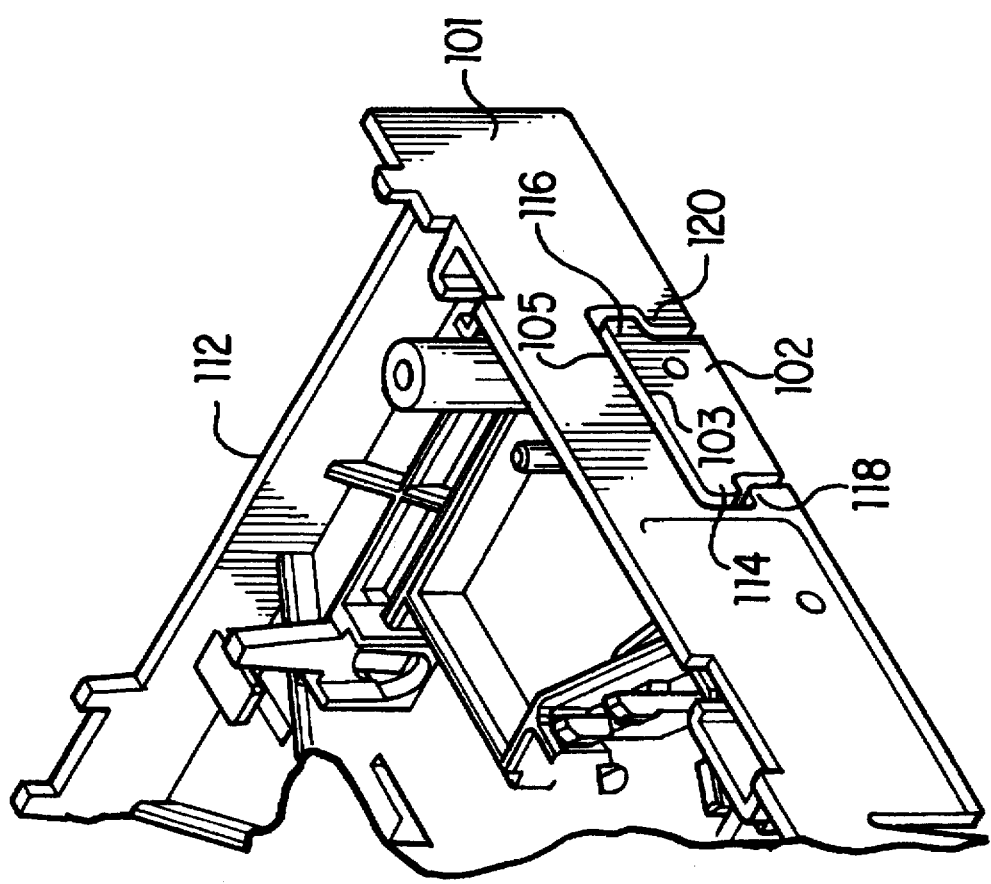
FIG. 4 shows a close-up top, side view of an isolation mounting feature of a tape chassis according to the first embodiment of the present invention.
Figure 5:
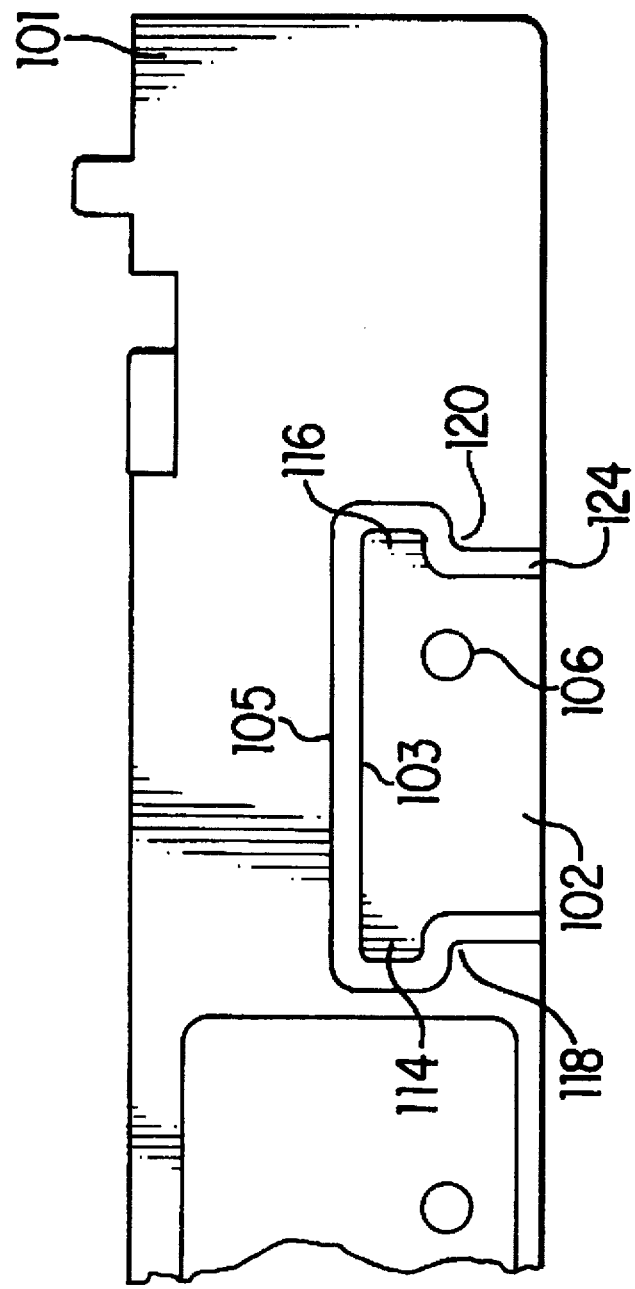
FIG. 5 shows a close-up side view of an isolation mounting feature of a tape chassis according to the first embodiment of the present invention.

FIG. 3 shows a tape drive chassis 100 according to a first embodiment of the present invention, tape drive chassis 100 has a front end 110 where a tape cartridge (not shown) is inserted during operation and a back wall 112. Tape drive chassis 100 also has two side walls, side wall 101 and side wall 107. Side walls 101 and 107 have front mounting holes 108 integral therewith for receiving a screw, rivet, or other mounting means. Tape drive chassis 100 has isolation mounting features 102 and 104 in side walls 101 and 107, respectively. As can be seen on isolation mounting feature 102, the isolation mounting features have a side mounting hole 106. Mounting hole 106 is designed to receive a screw, rivet or other mounting means. Generally, a tape drive chassis is installed into a computer bay (not shown) by means of screws, rivets, or other mounting means securing the sides 101 and 107 to the walls of the computer bay or to some other mounting features inside the computer bay. A tape drive chassis may also be installed into a computer bay by securing the bottom (111 in FIG. 6) of the tape drive chassis to an appropriate surface in the computer bay.

Figure 6:
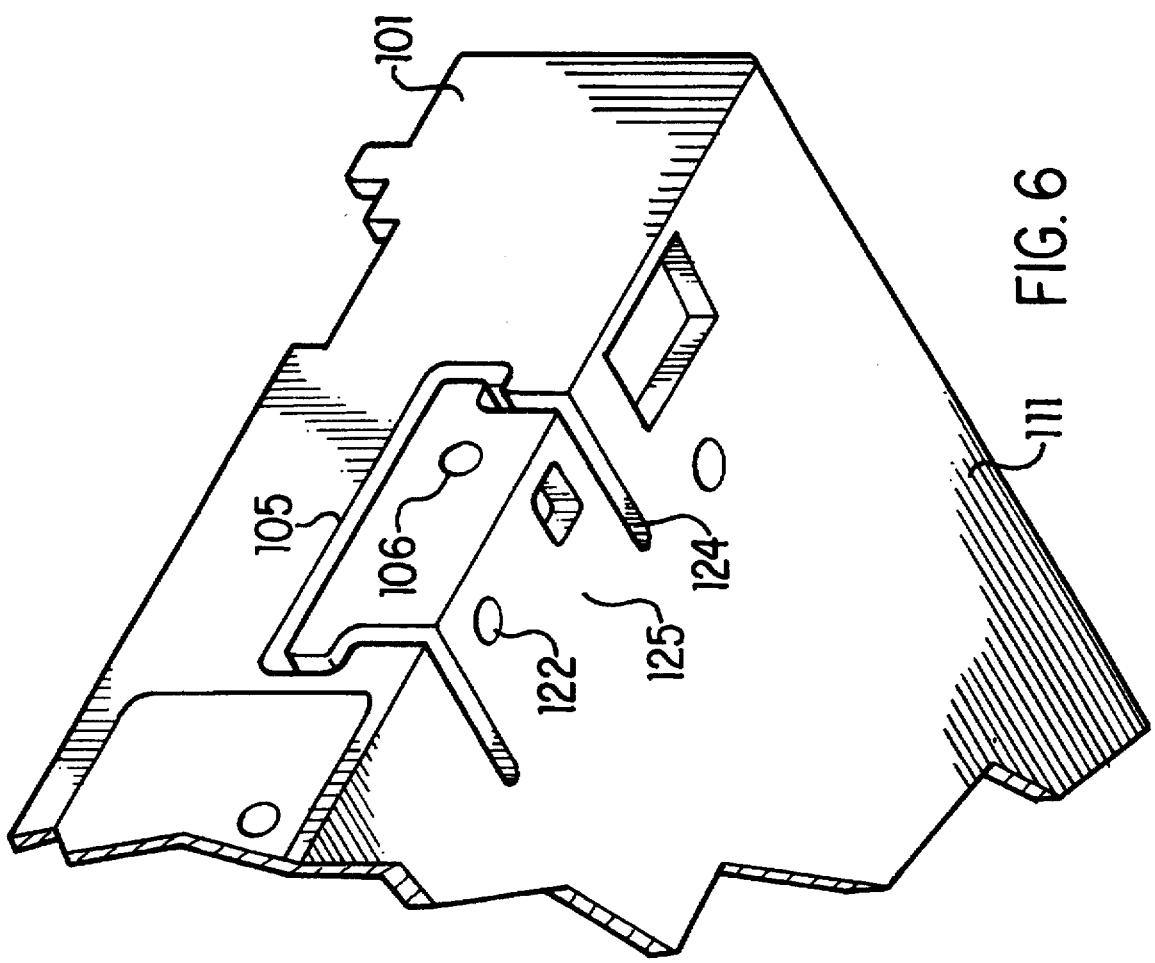
FIG. 6 shows a close-up bottom, side view of an isolation mounting feature of a tape chassis according to the first embodiment of the present invention.

Referring now to FIGS. 3, 4, 5 and 6, isolation mounting feature 102 will be described in more detail. Isolation mounting feature 102 is a rigid spring arm 125 (FIG. 6) that is integral with, but isolated from chassis 100 along all but one side by way of an aperture 124. Isolation mounting feature 102 has a side mounting hole 106 and a bottom mounting hole 122 (FIG. 6). Thus, disk drive 100 can be mounted into a computer bay by means of side mounting hole 106 or bottom mounting hole 122, depending on the location of the corresponding mounting features in the computer bay.

Isolation mounting feature 102 has two travel limit stops 114 and 116 on either side of an upper surface 103. Chassis side wall 101 has stops 105, 118 and 120, which correspond to travel limit stops 114 and 116. Accordingly, if chassis 100 is installed in a computer bay that is excessively twisted, or if the computer bay is twisted after the tape drive chassis is installed, edge 105 of side wall 101 will stop the upper edge 103 of isolation mounting feature 102 from excessive upward movement. Also, stops 118 and 120 in side wall 101 will catch travel limit stops 114 and 116 to prevent excessive downward movement of isolation mounting feature 102. Accordingly, isolation mounting feature 102 allows a predetermined limited amount of flexibility in order to conform to a twisted computer bay or uneven computer bay mounting holes, but prevents excessive torque and maintains the structural integrity of chassis 100 for alignment purposes. Moreover, by limiting the movement of isolation mounting feature 102, the possibility of bending feature 102 to the breaking point is obviated.

Thus, in a best mode circumstance, tape drive chassis 100 would be mounted in a computer bay (not shown) by two forward mounting features that are integral with chassis 100, such as mounting hole 108. These forward mounting features could alternatively be on the bottom of chassis 100, depending on the mounting features of the computer bay into which the chassis is to be installed. The back of chassis 100 would then be mounted into the computer bay via mounting holes 106 and 138 of isolation mounting features 102 and 104 on either side of the chassis. Accordingly, the front end of chassis 100 is kept rigid in order to maintain the magnetic head to tape alignment, while the isolation mounting features 102 and 104 absorb the twist of the computer bay or misalignment of computer bay mounting holes.

Isolation mounting feature 102 and 104 are preferably formed along the corner 113 between the bottom 111 and the side wall 101 (or the bottom 111 and the back wall 112) of tape drive chassis 100. While the isolation mounting features may be formed elsewhere on the tape drive chassis 100, placing the isolation features in the back half of the chassis is considered to be preferable for most purposes in order to maintain the magnetic head to tape alignment in the front end of the drive chassis. However, isolation mounting features 102 and 104 may be formed along the back wall 112 of chassis 100 or elsewhere as the construction and components of the tape drive and computer bay permit. Isolation mounting features 102 and 104 may also be formed as a single isolation mounting feature, as opposed to two isolation mounting features. This is not as preferable as torque absorption will be dependent on a single side of the chassis, and thus, will be more severe.

In a best mode, tape drive chassis 100 is manufactured by means of a plastic injection molding process of a glass filled poly-carbonate, engineering/structural grade resin or other structural similarly rigid material. If this manufacturing method is used, the manufacturing costs will be lower; the part count will be less; the assembly/disassembly time, difficulty and costs will be lower; the weight of the chassis will be less and the structural integrity of the chassis-mounting features will be better than a chassis that utilizes non-integral, mounting features. It should be noted that the chassis and isolation mounting features are not limited to either glass filled poly-carbonate or to an injection molding process. For example, the chassis and isolation mounting features could be made of a stamped metal that has proper rigidity and spring hard features, so long as the material is flexible enough to absorb the torque of the computer bay and rigid enough to tolerate the shock load of dropping, mounting, etc.

Figure 7:
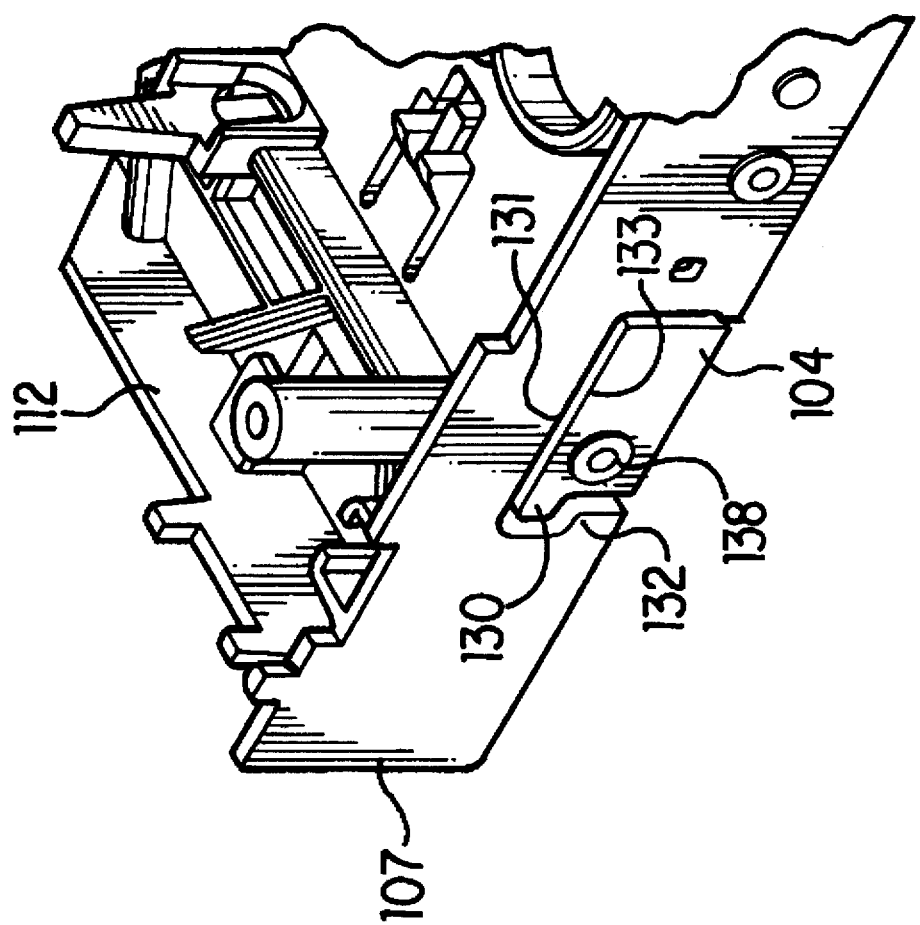
FIG. 7 shows a close-up top, side view of an isolation mounting feature of a tape chassis according a second embodiment of the present invention.
Figure 8:
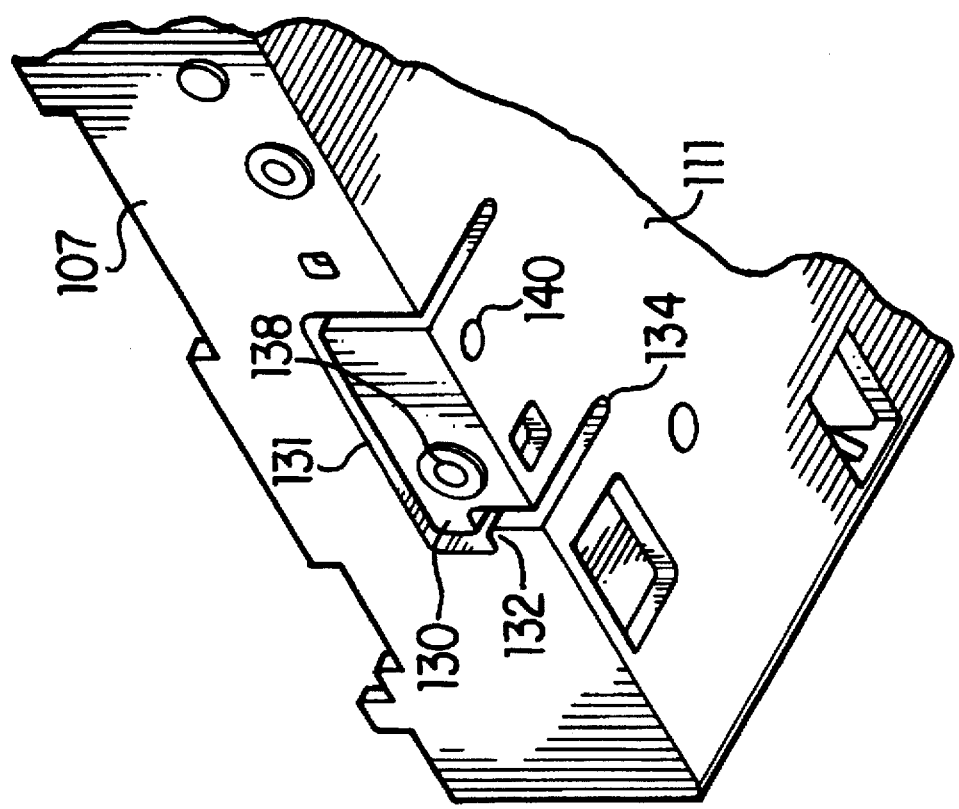
FIG. 8 shows a close-up bottom, side view of an isolation mounting feature of a tape chassis according to the second embodiment of the present invention.

FIGS. 7 and 8 show an isolation mounting feature 104 according to a second embodiment of the present invention. Isolation mounting feature 104 is similar to isolation mounting feature 102 except that isolation mounting feature 104 has only one travel limit stop 130 that corresponds to a stop 132 in side wall 107 of chassis 100. Edge 131 of side wall 107 will stop upper edge 133 of isolation mounting feature 104 from excessive upward movement. As with isolation mounting feature 102, isolation mounting feature 104 has a side mounting hole 138 and a bottom mounting hole 140 and a separation aperture between feature 133 and chassis 100 on all but one side. Although isolation mounting feature 104 may absorb slightly more torque than isolation feature 102, this should not cause any structural integrity problems and may be necessary if the design of the tape drive chassis does not allow room for two travel limit stops on the isolation feature.

Figure 9:
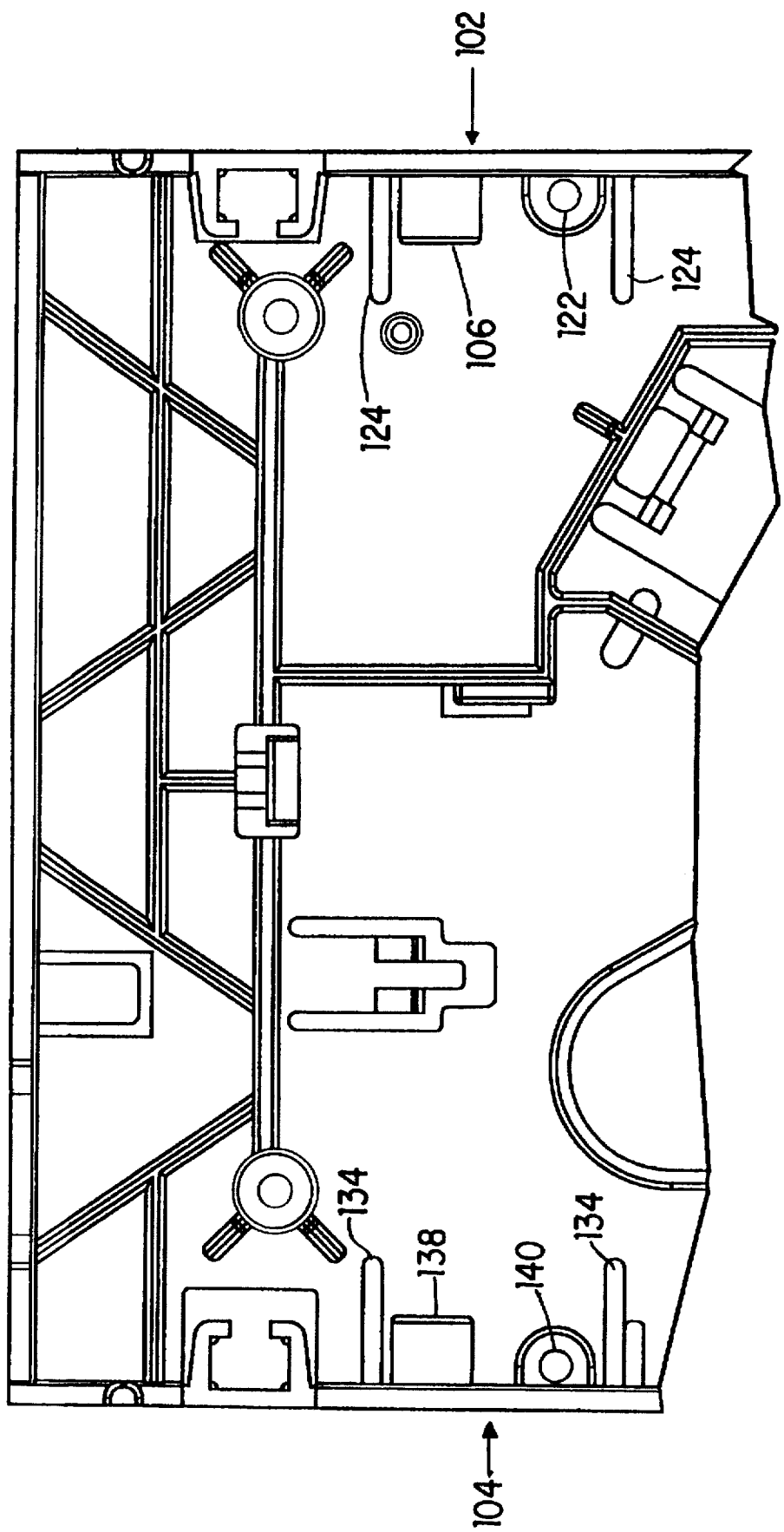
FIG. 9 shows a top cut-away view of a tape chassis with isolation mounting features according to the first and second embodiments of the present invention.

FIG. 9 is a cut-away, top view of the back half of a tape drive chassis 100 that shows the two isolation mounting features 102 and 104. Isolation mounting feature 102 includes separation aperture 124, side mounting hole 106 and bottom mounting hole 142. Isolation mounting feature 104 includes separation aperture 134, side mounting hole 138 and bottom mounting hole 140. It should be noted that the size of an isolation mounting feature is only restricted by the size, shape and number of mounting holes and travel limit stops.

Figure 10:
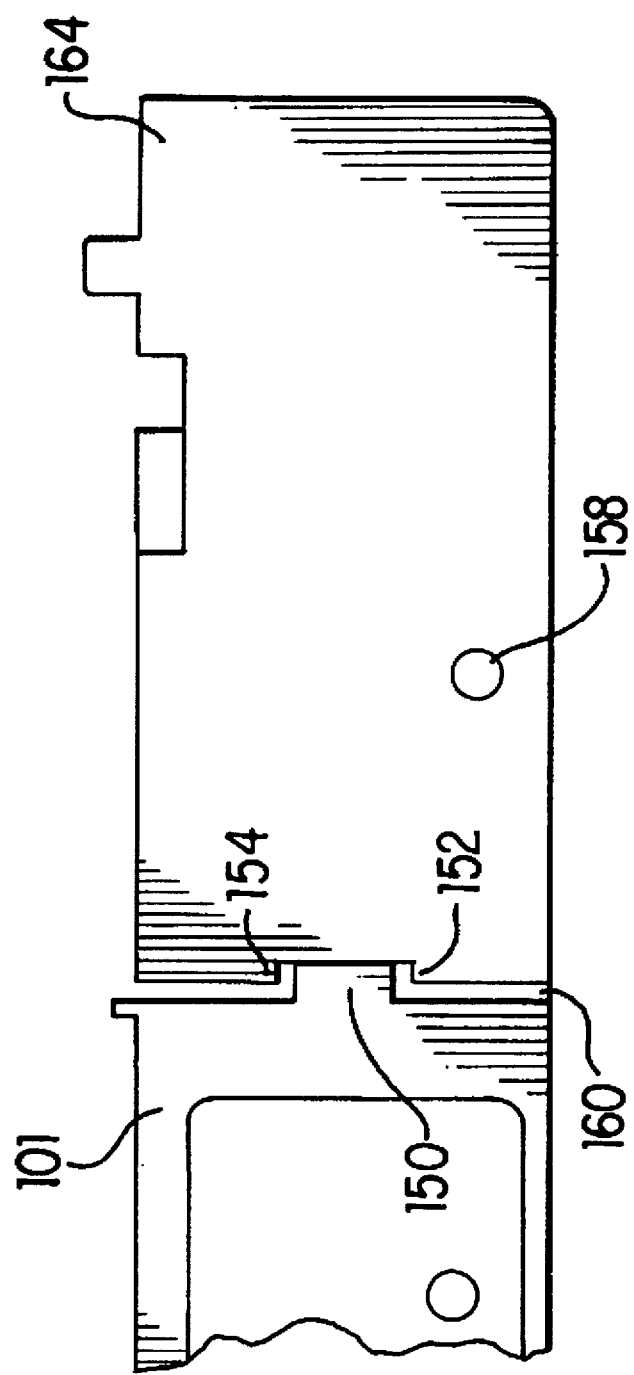
FIG. 10 shows a close-up side view of an isolation mounting feature of a tape chassis according to a third embodiment of the present invention.

FIGS. 10 and 11 show an isolation mounting feature 164 according to a third embodiment of the present invention. Isolation mounting feature 164 is located in a back corner of chassis 100 and is separated from chassis 100 by a z-shaped separation aperture 160 that crosses between bottom 111 (FIG. 11) and side wall 101 of tape drive chassis 100. Chassis 100 includes a travel limit stop 150 that catches stop 154, preventing excessive downward torque and catches stop 152, preventing excessive upward torque. Isolation mounting feature 164 has a side mounting hole 158 and a bottom mounting hole 162 such that the manner of mounting can conform to the location of mounting features in the computer bay. Isolation mounting feature 164 is not a preferred embodiment if the chassis is to be made by the process of plastic injection molding, because the flow path does not insure adequate fill within the mold cavity to reach the farthest edges of isolation feature 164 around the z-shaped separation aperture 160 using injection molding. However, if a different manufacturing method is used, such as stamped metal or a secondary machining process, than this type of isolation mounting feature works extremely well. Also, due to the shape and location of the isolation mounting feature 164, this type of isolation mounting feature works well as a single isolation mounting feature, as opposed to a chassis with two isolation mounting features.

The foregoing description of the present invention has been presented for purposes of illustration and description. It is not intended to be exhaustive or to limit the invention to the precise form disclosed, and other modifications and variations may be possible in light of the above teachings. For example, the isolation mounting feature could be made of any shape or size so long as there are mounting holes or other mounting means on the isolation mounting feature and there is some type of travel limit included in the isolation mounting feature. Moreover, the concept of isolation mounting features is not limited to tape drive chassis, but would be appropriate in any high density storage medium where alignment of read/write elements to the storage medium is an issue. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A high density storage chassis, said high density storage chassis comprising:

a bottom surface;

a first side wall;

a second side wall, said first and said second side walls being on opposing sides of said bottom surface;

a back wall attached to said bottom surface between said first and said second side walls;

a front side opening opposite said back wall between said first and said second side walls;

a first mounting hole in said first side wall near said front side opening;

a second mounting hole in said second side wall near said front side opening;

a first isolation mounting feature in said first side wall near said back wall, said first isolation mounting feature being integral with said high density storage chassis, wherein said first isolation mounting feature is separated from said high density storage chassis by an aperture along all but one side of said first isolation mounting feature, said first isolation mounting feature having at least one travel limit stop;

at least one stop in said first side wall, said at least one stop corresponding to said at least one travel limit stop on said first isolation mounting feature such that when said first isolation mounting feature is bent a predetermined distance, said at least one stop in said first side wall contacts said at least one travel limit stop on said first isolation mounting feature and prevents any further bending;

a second isolation mounting feature in said second side wall near said back wall, said second isolation mounting feature being integral with said high density storage chassis, where said second isolation mounting feature is separated from said high density storage chassis by an aperture along all but one side of said second isolation mounting feature, said isolation mounting feature having at least one travel limit stop; and at least one stop in said second side wall, said at least one stop corresponding to said at least one travel limit stop on said second isolation mounting feature such that when said second isolation mounting feature is bent a predetermined distance, said at least one stop in said second side wall contacts said at least one travel limit stop on said second isolation mounting feature and prevents any further bending.

* * * * *